United States Patent
Zhou

(10) Patent No.: US 8,811,007 B2
(45) Date of Patent: Aug. 19, 2014

(54) DOCKING STATION FOR ELECTRONIC DEVICE

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/210,382

(22) Filed: Aug. 16, 2011

(65) Prior Publication Data

US 2012/0182675 A1  Jul. 19, 2012

(30) Foreign Application Priority Data

Jan. 18, 2011 (CN) .......................... 2011 1 0020369

(51) Int. Cl.
*H05K 7/00* (2006.01)
*G06F 1/16* (2006.01)

(52) U.S. Cl.
CPC .................................... *G06F 1/1632* (2013.01)
USPC .................. 361/679.41; 361/679.55; 710/303

(58) Field of Classification Search
CPC ................................ G06F 1/1632; G06F 1/166
USPC ............ 361/679.01, 679.02, 679.09, 679.21, 361/679.26, 679.27, 679.08, 361/679.55–679.58, 679.41, 679.3; 248/917–924; 455/575.1–575.4; 379/433.11–433.13; 710/303–305
See application file for complete search history.

(56) References Cited

U.S. PATENT DOCUMENTS

| | | | |
|---|---|---|---|
| 7,679,902 B2 * | 3/2010 | Thompson | 361/679.44 |
| 8,422,206 B2 * | 4/2013 | Fu et al. | 361/679.01 |
| 2004/0037032 A1 * | 2/2004 | Hubbard | 361/683 |
| 2008/0006744 A1 * | 1/2008 | Sun | 248/161 |

* cited by examiner

*Primary Examiner* — Anthony Haughton
*Assistant Examiner* — Ingrid Wright
(74) *Attorney, Agent, or Firm* — Novak Druce Connolly Bove + Quigg LLP

(57) ABSTRACT

A docking station for supporting an electronic device in two positions includes a main body, and first and second supporting members projecting from the main body. The main body cooperates with the first supporting member to support the electronic device in the first position with the main body being stable on a first plane; and the first member cooperates with the second member to support the electronic device in the second position with the main body being stable on a second plane different from the first plane.

12 Claims, 7 Drawing Sheets

DOCKING STATION FOR ELECTRONIC DEVICE

BACKGROUND

1. Technical Field

The present disclosure relates to a docking station for an electronic device.

2. Description of Related Art

Portable electronic devices, such as mobile phones, often use docking stations for supporting the electronic devices. The docking station usually includes a main body and one or more interface (such as a USB port) projecting out of the main body. The interface can be inserted into the electronic device, whereby the electronic device is electrically connected to the docking station. However, the docking station always supports the electronic device in a particular orientation, and the docking station cannot be used to support the electronic device in another position.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the seven views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
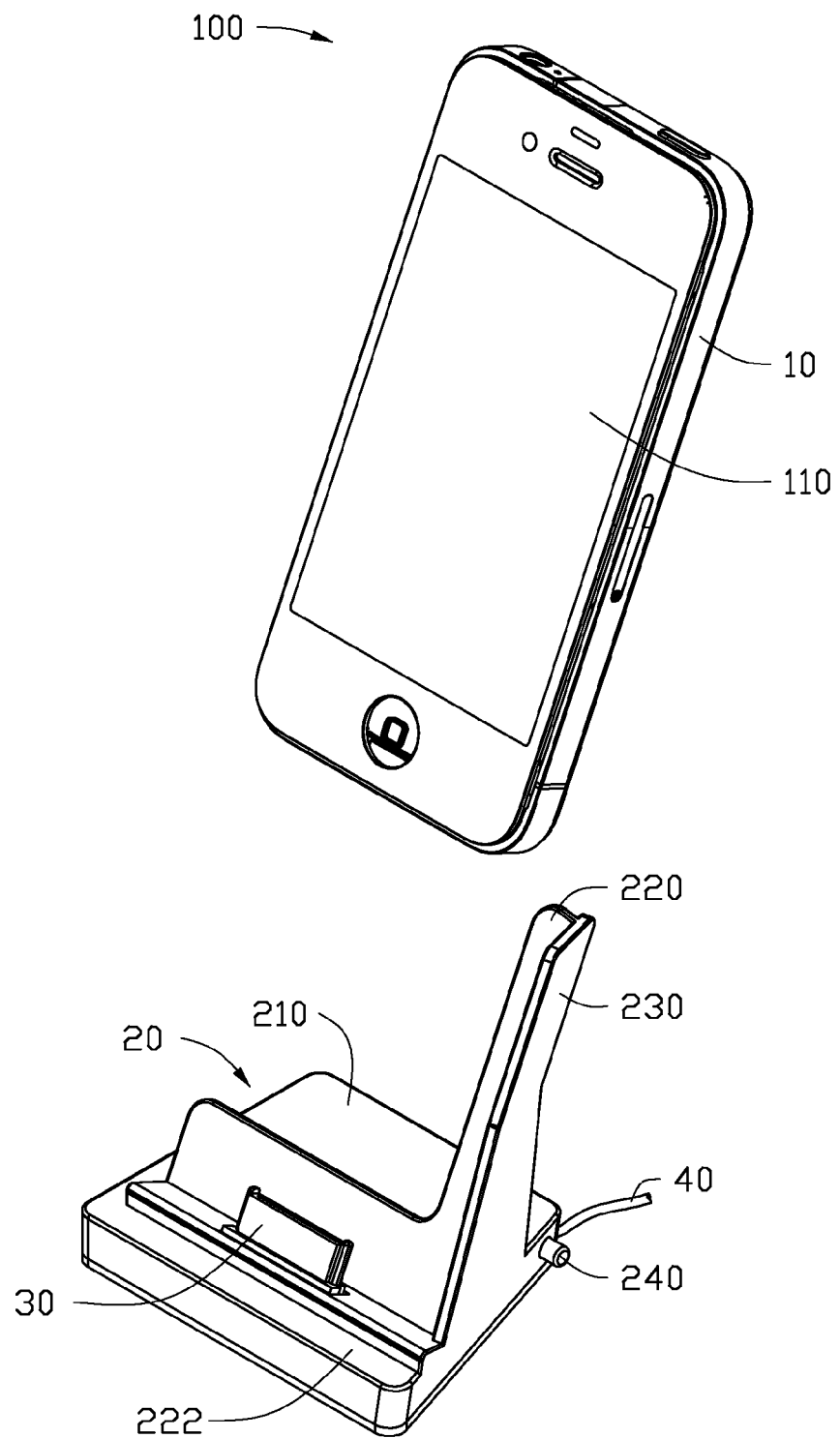
FIG. 1 is a perspective view of a docking station for an electronic device in accordance with an exemplary embodiment, the docking station includes an adjusting mechanism.

Referring to FIG. 1, an electronic device assembly 100 including an electronic device 10 and a docking station 20 in accordance with an embodiment is shown. The electronic device 10 is a mobile phone in the embodiment. The electronic device 10 includes a display 110 for videos, pictures, and documents. The docking station 20 is adapted to support and charge the electronic device 10. The docking station 20 is capable of supporting the electronic device 10 in a first position and in a second position perpendicular to the first position, such that the display 110 of the electronic device 10 may be viewed vertically or horizontally. Furthermore, the electronic device 10 includes a socket (not shown) designed for an interface 30, such as a USB port.

Figure 2:
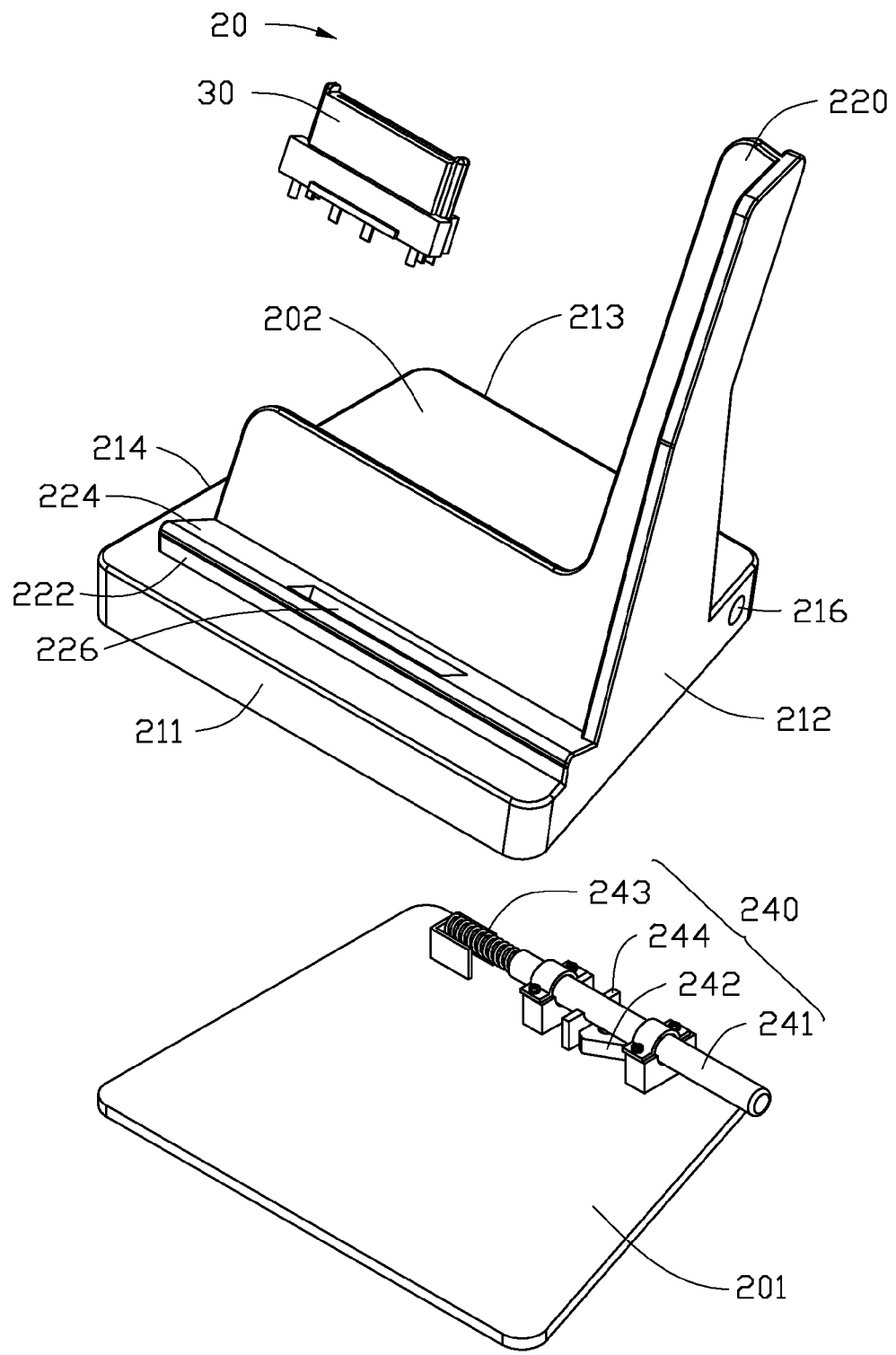
FIG. 2 is a partially disassembled perspective view of the docking station in FIG. 1.

Referring also to FIG. 2, the docking station 20 includes a main body 210, an interface 30 for electrically connecting with the electronic device 10, a first supporting member 220 and a second supporting member 230 arranged on the main body 210, and an adjusting mechanism 240. The main body 210 is placed on a supporting surface (not shown), such as a table, and is stable on both a first plane parallel to the supporting surface to and on a second plane which is perpendicular to the supporting surface. When the main body 210 is stable on the first plane, the first supporting member 220 cooperates with the main body 210 to support the electronic device 10 in a first position. When the main body 210 is stable on the second plane, the first supporting member 220 cooperates with the second supporting member 230 to support the electronic device 10 in the second position. The adjusting member 240 is secured to the main body 210 and is adapted to adjust the height of an end of the main body 210 relative to the supporting surface, when the main body 210 is stable on the second plane.

The main body 210 includes a bottom case 201, a top case 202 opposite to the bottom case 201, and four sidewalls (hereinafter, a first sidewall 211, a second sidewall 212, a third sidewall 213 opposite to the first sidewall 211, and a fourth sidewall 214 opposite to the second sidewall 212). The four sidewalls 211, 212, 213, 214 serially interconnect and are perpendicular to the bottom and top cases 201, 202. The four sidewalls 211, 212, 213, 214 cooperate with the bottom and the top cases 201, 202 to define a receiving space (not shown) for receiving the adjusting mechanism 240 and other electronic components of the docking station 20. In the embodiment, the main body 210 is substantially an isosceles trapezoid in horizontal cross-section, the first sidewall 211 is parallel to the third sidewall 213, and the length of the second sidewall 212 is equal to that of the fourth sidewall 214. The first sidewall 211 forms an acute angle with the second sidewall 212. The second sidewall 212 defines a through hole 216. The through hole 216 is arranged adjacent to an end of the second sidewall 212 opposite to the first sidewall 211. A stand 222 projects from the top case 202. The stand 222 is adjacent to and parallel to the first sidewall 211. The stand 222 includes an inclined surface 224 slanting down to the top case 202 so as to accommodate the backward-leaning aspect of the electronic device 10 when placed in the docking station 20. The inclined surface 224 recesses to define an elongated hole 226 for receiving the interface 30.

The first supporting member 220 is substantially L-shaped, and slants upwards from the top case 202. The first supporting member 220 connects with an end of the stand 222 opposite to the first sidewall 211 and is perpendicular to the inclined surface 224.

The second supporting member 230 perpendicularly projects from a rim of the top case 202 adjacent to the second sidewall 212. The second supporting member 230 perpendicularly connects with the first sidewall 211 and is coplanar with the second sidewall 212.

The interface 30 is used to electrically connect with the electronic device 10. The interface 30 is received in the elongated hole 226 and arranged parallel to the first supporting member 220.

Figure 3:
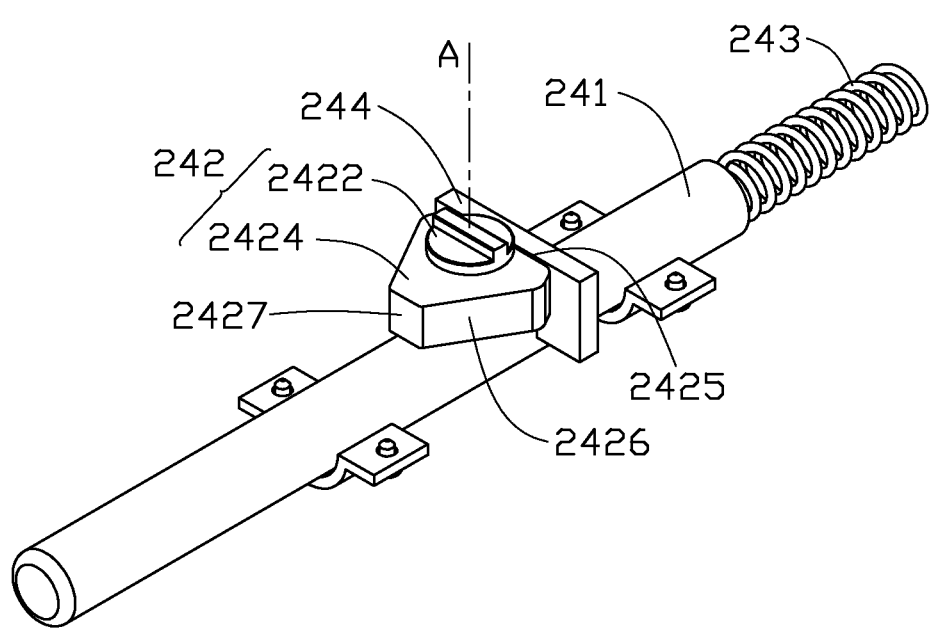
FIG. 3 is a perspective view of the adjusting mechanism of the docking station of FIG. 2.

Referring to FIG. 3, the adjusting member 240 is received in the main body 210 and is arranged adjacent to the third sidewall 213. The adjusting member 240 includes a post 241, a driving member 242, an elastic element 243, and a stopping plate 244 fixed to the post 241. The post 241 is rotatably secured to the bottom case 201, and is capable of extending out of the main body 210 via the through hole 216. The elastic element 243 is coupled to an end of the post 241 and provides a constant pressure to drive the post 241 extending out of the main body 210. The driving member 242 is rotatably arranged at the bottom case 201 and resists against a side of the stopping plate 244 opposite to the elastic element 243. The driving member 242 may be operated to adjust the length of the post 241 extending out of the through hole 216.

Figure 4:
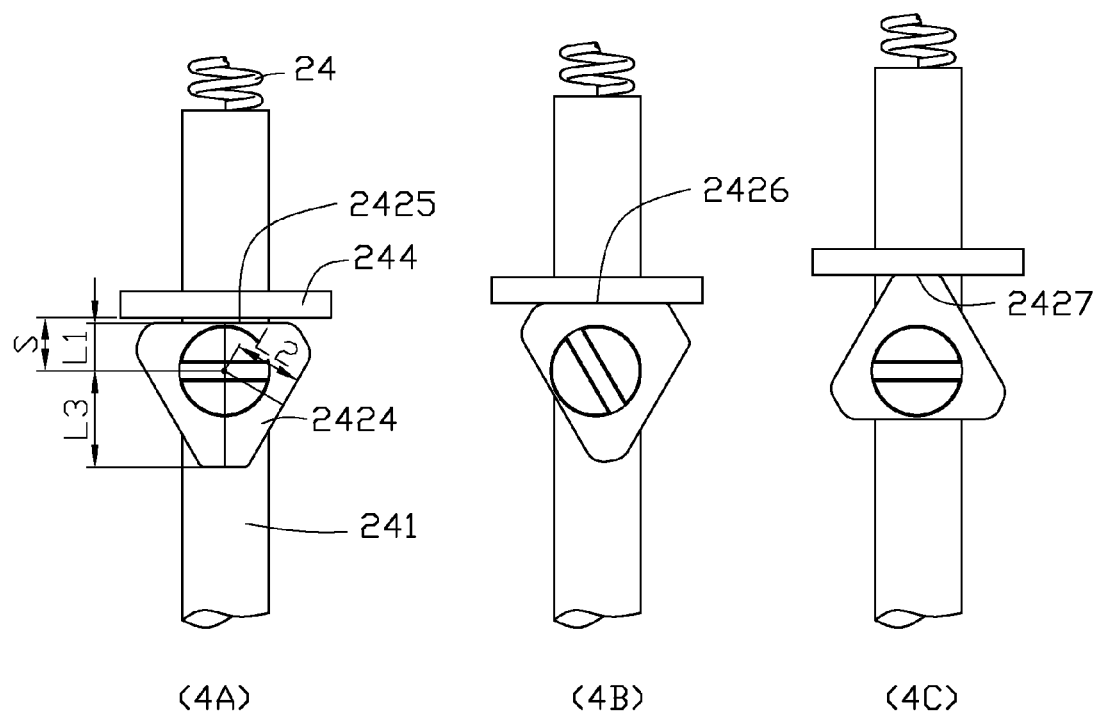
FIG. 4 is a view showing the adjusting mechanism of FIG. 3 in different working positions.

The driving member 242 includes a cam 2422 and a knob 2424 secured to the cam 2422. The cam 2422 is rotatably coupled to the bottom case 201 and may be rotated to adjust the length of the post 241 extending out of the main body 210. The knob 2424 is operated to drive the cam 2422 rotating on axis A (see FIG. 3). In the embodiment, the cam 2422 is substantially a trapezoid, and includes four sides (hereinafter, a first side 2425, a pair of second side 2426, and a third side 2427). The distances L1, L2, L3 respectively between the axis A and the sides 2425, 2426, 2427 are different, in the embodiment, L1<L2<L3 (see FIG. 4).

Referring to FIGS. (4A)-(4B), when the cam 2422 is rotated, the distance S between the stopping plate 244 and the axis A (distance S) is changed, and the length of the post 141 extending out of the through hole 216 is thereby changed. For example, when the first side 2425 resists against the stopping plate 244 (see FIG. 4A), the distance S is the shortest, and the length of the post 241 extending out of the through hole 216 is the longest. When the second side 2426 resists against the stopping plate 244 (see FIG. 4B), the distance S is equal to L2, and the length of the post 241 extending out of the through hole 216 becomes shorter. When the third side 2427 resists against the stopping plate 244 (see FIG. 4C), the distance S is equal to L3 and is the longest, and the length of the post 241 extending out of the through hole 216 is the shortest. Thus, with the assistance of the cam 2422, the length of the post 241 extending out of the main body 210 can be changed and set.

Figure 5:
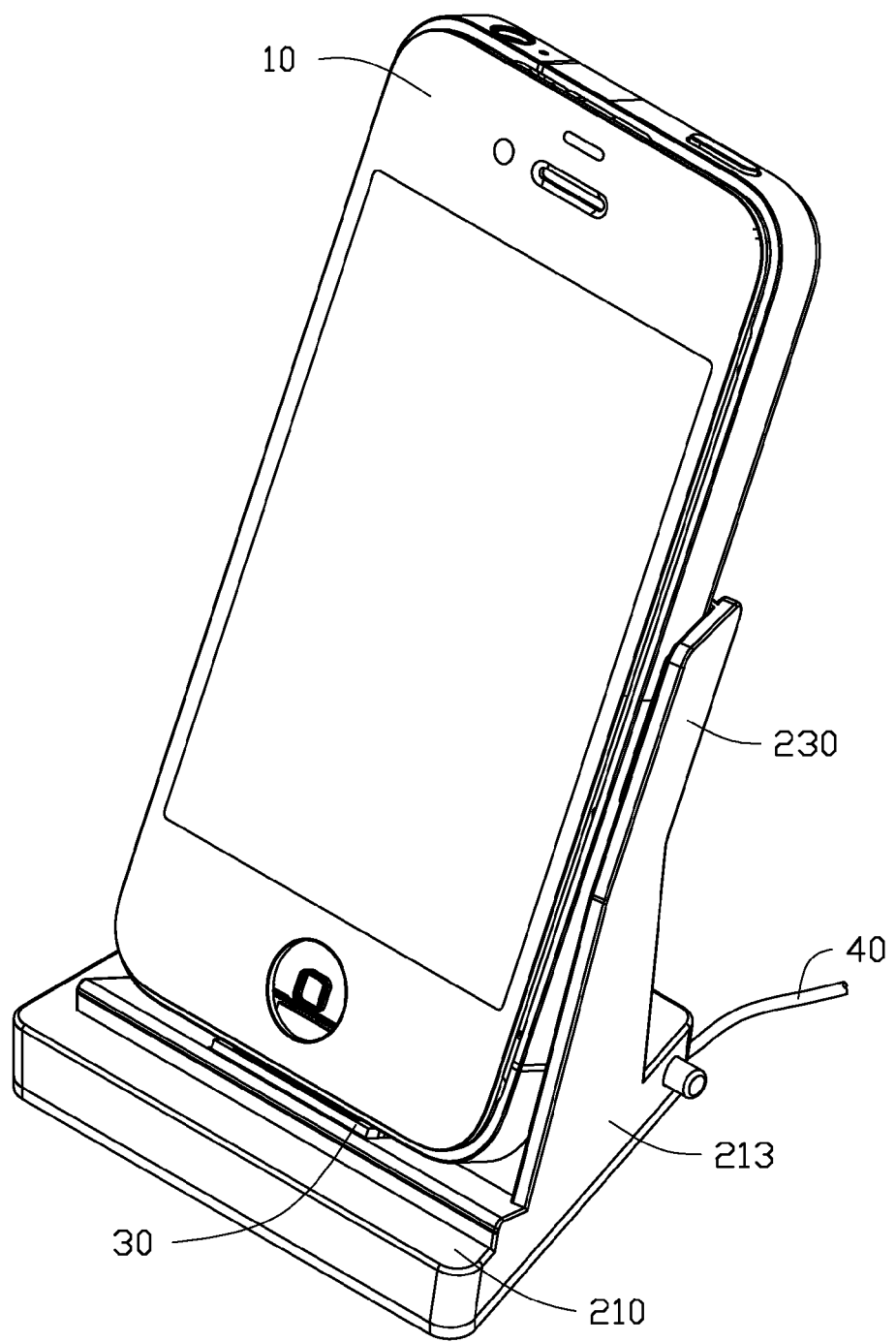
FIG. 5 is a perspective view showing the electronic device being supported in a first position by the docking station of FIG. 1.

Referring to FIG. 5, in use, when the docking station 20 is used in the first state and the main body 210 is stable on the first plane parallel to the supporting surface (such as a table), the electronic device 10 is electrically connected to the docking station 20 by the interface 30, and is supported in the first position by the main body 210 cooperating with the first supporting plate 220.

Figure 6:
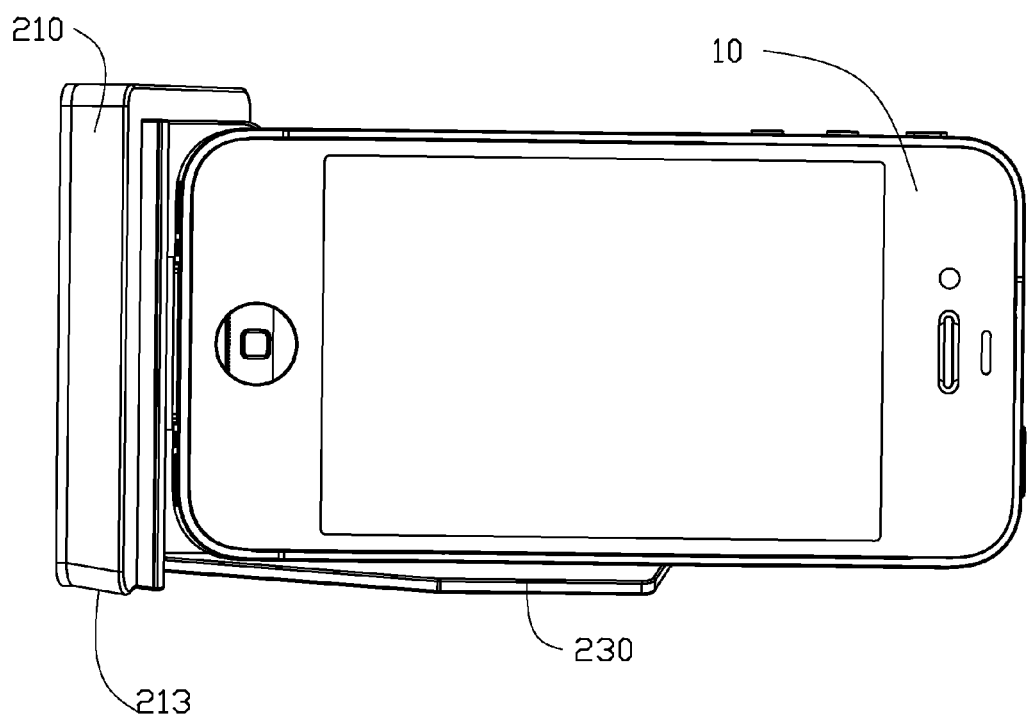
FIG. 6 is a perspective view showing the electronic device being supported in a second position by the docking station of FIG. 1.
Figure 7:
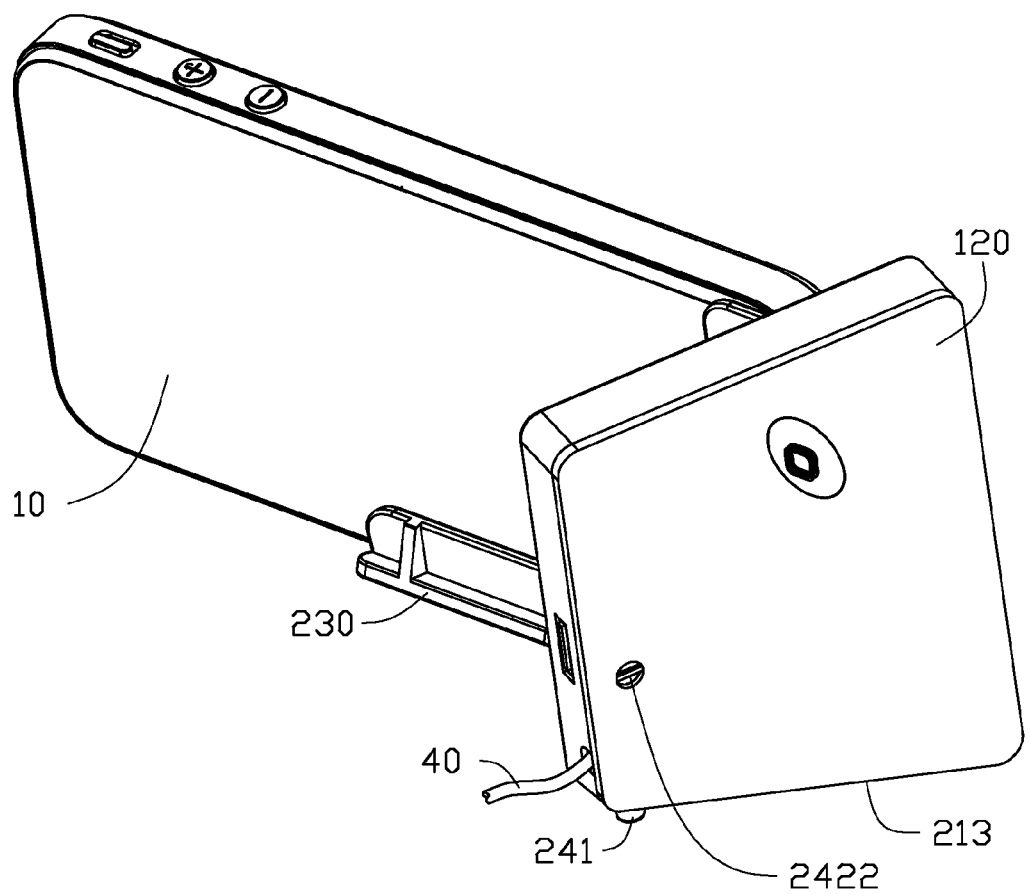
FIG. 7 is similar to FIG. 6, but viewed from another aspect.

Referring to FIGS. 6 and 7, when the docking station 20 is bodily turned clockwise through ninety degrees, with the second sidewall 212 and the second supporting member 230 placed on the supporting surface, the docking station 20 is used in the second state, and the main body 210 is stable on the second plane. In this state, the electronic device 10 is supported in the second position by the first supporting member 220 cooperating with the second supporting member 230. Furthermore, by adjusting the length of the post 241 extending out of the through hole 216, the height of an end of the second sidewall 212 opposite to the first sidewall 211 may be changed, and the electronic device 10 can be viewed from different angles.

With assistance of the docking station 20, the electronic device 10 is capable of being supported in the first position and in the second position. Furthermore, by operating the adjusting mechanism 240, the electronic device 10 is capable of being viewed from different angles when the electronic device is supported in the second position.

Even though information and the advantages of the present embodiments have been set forth in the foregoing description, together with details of the structures and functions of the present embodiments, the disclosure is illustrative only; and changes may be made in detail, especially in matters of the shape, size, and arrangement of parts within the principles of the present embodiments to the full extent indicated by the broad general meaning of the terms in which the appended claims are expressed.

What is claimed is:

1. A docking station for supporting an electronic device in a first position and in a second position different from the first position, comprising: a main body comprising a first sidewall and a second sidewall interconnecting with the first sidewall; a first supporting member extending up from the main body; and a second supporting member extending up from the main body, the second supporting member projects from a rim of the main body and coplanar with the second sidewall; an adjusting mechanism secured to main body and is used to adjust the height of an end of the second sidewall relative to a first plane when the electronic device is supported by the docking station in the second position; wherein the adjusting member comprises a post and an elastic member, the post is slidably secured to the main body, the post is capable of extending out of the main body, and the elastic member is coupled to the post and is used to provide an elastic force for driving the post extending out of the main body; wherein the main body cooperates with the first supporting member to support the electronic device in the first position with the main body being stable on the first plane; and the first supporting member cooperates with the second supporting member to support the electronic device in the second position with the main body being turned to be stable on a second plane different from the first plane; wherein the adjusting member further comprises a cam rotatably coupled to the main body, the cam is rotatable around an axis and is rotated to adjust the length of the post extending out of the main body.

2. The docking station of claim 1, wherein the cam is substantially polygonal, the distances between the axis and sides of the cam are different.

3. The docking station of claim 1, wherein the second sidewall defines a through hole adjacent to an end thereof, the post extends out of the main body via the through hole.

4. A docking station for an electronic device, the docking station capable of being used in a first state and a second state, the docking station comprising: a main body capable of being stable on a first plane and in a second plane different from the first plane; a first supporting member projecting from the main body; a second supporting member projecting from the main body; and an adjusting mechanism secured to main body; wherein when the docking station being used in the first state, the main body is stable on the first plane, and cooperates with the first supporting member to support the electronic device in a first position; when the docking station being used in the second state, the main body being stable on the second plane, and the first member cooperates with the second member to support the electronic device in a second position different from the first position, and the adjusting mechanism is used to adjust the height of the second plane relative to the first plane when the electronic device is supported by the docking station in the second position; wherein the adjusting member comprises a post slidably secured to the main body, and a cam rotatably secured to the main body, the post is capable of extending out of the main body, the cam is rotatable about an axis and is rotated to adjust the length of the post extending out of the main body.

5. The docking station of claim 4, wherein the second plane is perpendicular to the first plane.

6. The docking station of claim 4, wherein the first supporting member is perpendicular to and interconnects with the second supporting member.

7. The docking station of claim 6, wherein the main body comprises a first sidewall and a second sidewall interconnecting with the first sidewall, the second supporting member projects from a rim of the main body and is coplanar with the second sidewall.

8. The docking station of claim 4, wherein the adjusting member further comprises an elastic member, the elastic member is coupled to the post and is used to provide an elastic force for driving the post extending out of the main body.

9. The docking station of claim 4, wherein the cam is substantially polygonal, the distances between the axis and sides of the cam are different.

10. A docking station for supporting an electronic device in a first position and in a second position different from the first position, comprising: a main body comprising a first sidewall and a second sidewall interconnecting with the first sidewall; a first supporting member projecting from the main body; and a second supporting member projecting from the main body and coplanar with the second sidewall; wherein the main body cooperates with the first supporting member to support the electronic device in the first position with the main body being stable on a first plane; and the first supporting member cooperates with the second supporting member to support the electronic device in the second position with the main body being stable on a second plane different from the first plane; wherein the docking station further comprising an adjusting mechanism, the adjusting mechanism is secured to main body and is used to adjust the height of an end of the second sidewall relative to the first plane when the electronic device is supported by the docking station in the second position; wherein the adjusting member comprises a post slidably secured to the main body, and a cam rotatably secured to the main body, the post is capable of extending out of the main body, the cam is rotatable around an axis and is rotated to adjust the length of the post extending out of the main body.

11. The docking station of claim 10, wherein the cam is substantially polygonal, the distances between the axis and sides of the cam are different.

12. The docking station of claim 10, wherein the adjusting member further comprises an elastic member, the elastic member is coupled to the post and is used to provide an elastic force for driving the post extending out of the main body.

* * * * *